Dec. 30, 1930.                G. A. HATHORNE                1,786,653
                              NONSKID DEVICE
                            Filed Feb. 28, 1928
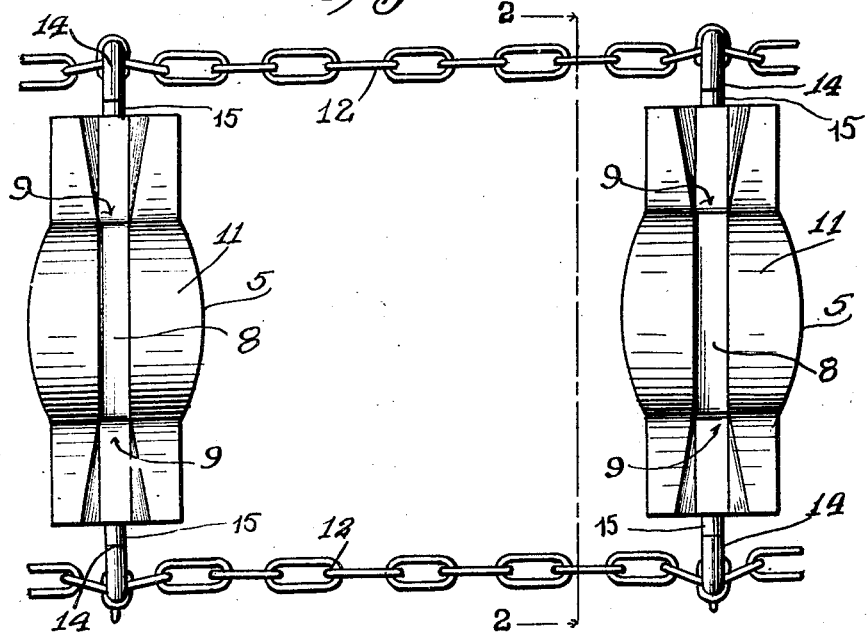
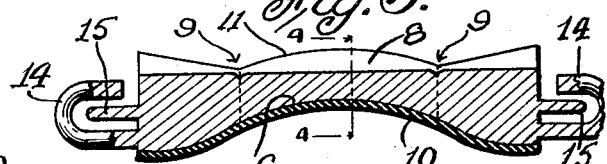
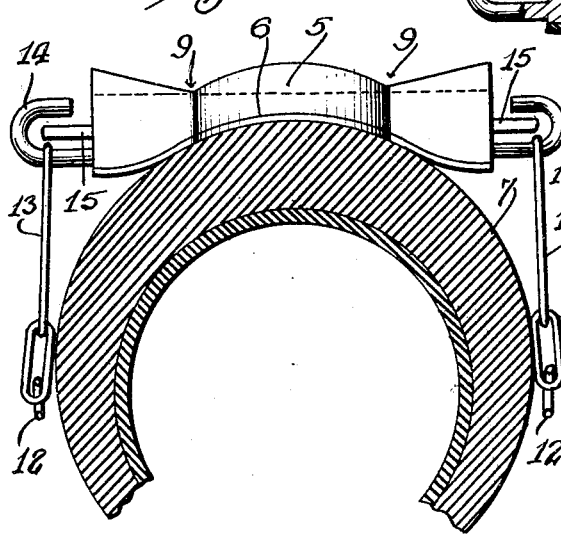
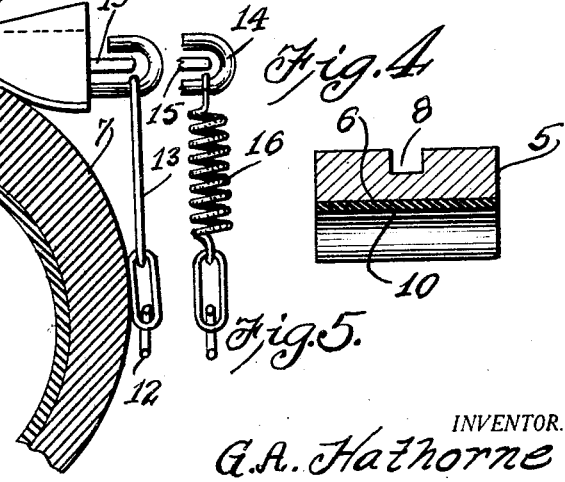
INVENTOR.
G.A. Hathorne
BY
ATTORNEY.

Patented Dec. 30, 1930

1,786,653

UNITED STATES PATENT OFFICE

GEORGE A. HATHORNE, OF GLOVERSVILLE, NEW YORK

NONSKID DEVICE

Application filed February 28, 1928. Serial No. 257,757.

This invention relates to improvements in non-skid devices, and has more particular reference to an improved device adapted to be applied to vehicle tires for increasing traction and preventing skidding.

More particularly, the present invention aims to provide an improved form of tread plate adapted to be positioned and suitably held crosswise of a tire and having an outer surface so grooved as to effectively increase traction or prevent longitudinal or lateral skidding.

A further object is to provide a tread plate of the above kind which is extremely simple and durable in construction and which may be effectively secured by various means in place upon the tread of a tire.

Still another object is to so construct the device that it may be effectively employed upon tires of different sizes and so engaged with the tire as to not readily turn about its longitudinal axis from proper operative position.

Other objects will appear as the nature of the invention is better understood, and the same consists in the novel form, combination and arrangement of parts hereinafter more fully described, shown in the accompanying drawing and claimed.

In the drawing:—

Figure 1 is a fragmentary plan view showing a portion of a skid chain equipped with tread plates constructed in accordance with the present invention;

Figure 2 is a transverse section on line 2—2 of Figure 1 with the device in position upon a tire;

Figure 3 is a central longitudinal section of one of the tread plates, partly broken away;

Figure 4 is a section on line 4—4 of Figure 3; and

Figure 5 is a fragmenary detail view illustrating a modified form of connection between the ends of the tread plate and the attaching means.

Referring more in detail to the drawing, the present invention consists of a relatively thick elongated plate 5 having a longitudinally curved inner surface as at 6 and adapted to be positioned crosswise of the tire 7 when in use, as shown in Figure 2, the radius of curvature of the surface 6 being relatively large to enable use of the tread plate upon tires of various sizes or cross-sectional diameters. In order to effectively increase traction and prevent longitudinal and sidewise skidding the plate 5 is provided with a central longitudinal groove 8 and spaced transverse grooves as at 9 in the outer surface thereof.

A rubber or fabric cushion lining 10 is adhesively or otherwise secured to the inner face of the tread plate for contact with the tread of the tire so as to prevent objectionable injury or marring of the latter, and in order to prevent the tread plate from readily turning about its longitudinal axis, the central portion thereof is considerably widened as at 11. In this way the tread plate is provided with a relatively wide central bearing surface for engagment with the tire, thus insuring that the tread plate will remain in proper position upon the tire under ordinary conditions of use when held reasonably firmly against the tread of the tire, and thus eliminating possibility of the grooved outer surface of the tread plate moving into contact with the tire and injuring the latter.

Any suitable means may be connected with the ends of the tread plate 5 for securing the same in place upon the tire, the ends of the tread plates being illustrated simply by way of example as connected to the respective side chains 12 of a skid chain by means of pairs of links, the outer ones of which are relatively long as indicated at 13. To facilitate connection of the links 13 with the ends of the tread plate, the ends of the latter are preferably provided with hooks 14 whose entrances are closed by fingers 15 overlapping and spaced from the bills of the hooks to facilitate disconnection of a damaged tread plate from the links 13 when necessary or desirable.

However, it is to be understood that the links 13 may be connected to other means than the side chains 12 for retaining the tread plate in position upon the tire. It will further be obvious that elastic or helical tension springs may be employed in lieu of the links 13 as indicated at 16 in Figure 5. In fact, the use of these springs is preferable as the contraction of the springs insures retention of the tread plates in firm contact with the tread of the tire under various conditions or use.

It will be apparent that the number and spacing of the tread plates used may be varied as desired or found necessary for producing the best results.

In view of the foregoing it will be seen that I have provided a simple and efficient form of tread plate adapted for use upon vehicle tires for effectively increasing traction and provide reasonable assurance against accident from skidding, the device being very effectual on muddy and sandy roads and capable of convenient application and economical manufacture.

Minor changes may be made without departing from the spirit and scope of the invention as claimed.

What I claim as new is:—

1. As a new article of manufacture, a tire shoe for anti-skid devices, consisting of a plate having a concave inner surface to fit a tire and having an outer face formed with a central longitudinal portion of convex form, terminating in end extensions having central inwardly converging recesses terminating in transverse channels, the convex surface of the plate being formed with a central longitudinal groove communicating with the said recesses.

2. As a new article of manufacture, a tire shoe for anti-skid devices, consisting of a plate having a concave inner surface to fit a tire and having an outer face formed with a central longitudinal portion of convex form terminating in end extensions having central converging recesses, the convex surface of the plate being formed with a groove communicating with said recesses.

In testimony whereof I affix my signature.

GEORGE A. HATHORNE.